July 21, 1936.   A. G. McKEE   2,048,613
METHOD OF AND APPARATUS FOR REDUCING THE VELOCITY OF FLUIDS
Filed Oct. 10, 1932
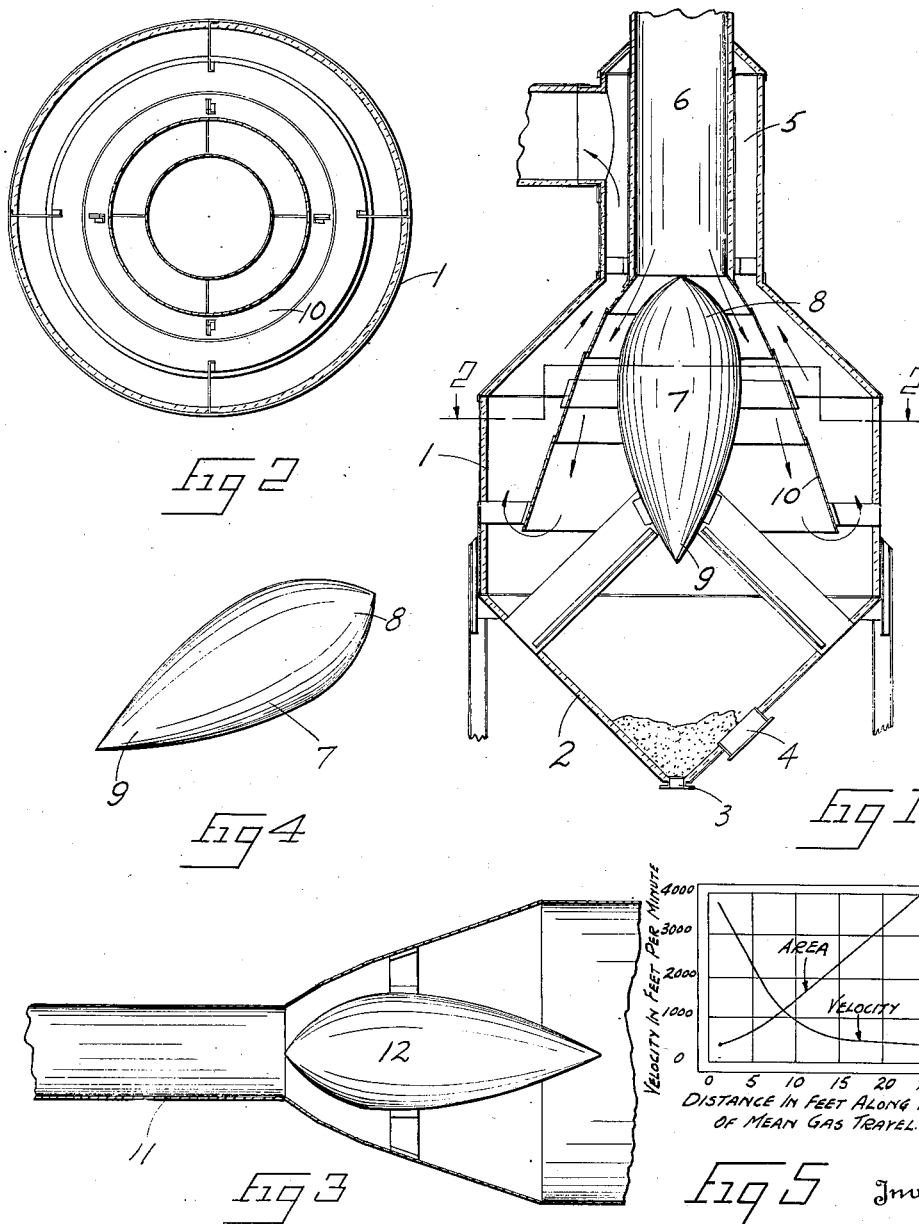

Patented July 21, 1936

2,048,613

UNITED STATES PATENT OFFICE 2,048,613

METHOD OF AND APPARATUS FOR REDUCING THE VELOCITY OF FLUIDS

Arthur G. McKee, Cleveland, Ohio

Application October 10, 1932, Serial No. 637,094

5 Claims. (Cl. 183—107)

This invention relates to the art of handling fluids. It is primarily concerned with methods and means for reducing the velocity of a fluid flowing rapidly in an enclosure, such as a pipe or the like. In certain of its aspects the invention relates to the reduction in velocity of a liquid or a gas, and in other aspects it relates to the reduction in velocity of a gas and a separation therefrom of solids.

Among the practical uses of the present invention are the following: Liquid, such as water, which is flowing rapidly in a pipe or similar passage may be greatly reduced in velocity without excessive disturbance. The velocity of gas flowing at a high speed in a pipe may be rapidly and smoothly reduced. For example, the exhaust gases from an engine may be rapidly reduced in velocity and at the same time the noise of the explosion may be greatly reduced. Rapidly moving gases, containing solids, may be effectively handled so as greatly to decrease the velocity of the gases and at the same time to separate the solids therefrom. This latter application of the invention will be specifically described hereinafter.

In the drawing accompanying and forming a part of this specification—

Figure 1 is a vertical sectional view of one form of apparatus embodying the present invention and adapted for handling blast furnace gases and separating solids therefrom.

Figure 2 is a horizontal sectional view taken on line 2—2 of Figure 1.

Figure 3 is a modified form of apparatus for use in the handling of gases or liquids.

Figure 4 is a perspective view of the stream line diffusing core member shown in Figures 1, 2 and 3, and Figure 5 is a curve showing the relation between gas velocity and the area traversed by the gas in the apparatus of Figure 1.

One disadvantage inherent in prior art devices for handling fluids, and more particularly gases containing solids to be separated therefrom, is the creation of eddy currents which effectively prevent a smooth flow of the fluid during retardation of its velocity. In case of gases carrying solids, such eddy currents prevent the separation of the solids therefrom to the desired extent, and in many instances result in a picking up of previously separated solids. The present invention avoids these disadvantages and makes it possible not only smoothly and rapidly to reduce the velocity of the flowing fluid without creating eddy currents of magnitude greater than a permissible maximum, but in the case of gases containing solids, to separate solids therefrom to an extent not heretofore possible, and to avoid the picking up of solids by the gas after they have once been separated.

Broadly considered, the present invention is based on the discovery that the velocity of fluids flowing at a high speed in a pipe or suitable passage may be rapidly and smoothly reduced by the steps of changing a more or less cylindrical stream of fluid into a hollow cylindrical stream abruptly but without the creation of eddy currents exceeding a permissible maximum in magnitude, and thereafter gradually and smoothly decreasing the space within the stream, preferably accompanied by a gradual and smooth expansion of the outer diameter of the stream, and if desired, with a final conversion of the hollow tubular stream into one of solid cylindrical form. Obviously, various types of apparatus may be employed for the foregoing purposes, but generally considered they include a cylindrical pipe or passage for the fluid, a more or less stream line core member axially aligned with the pipe, with the end thereof adjacent the pipe being rather blunt but not sufficiently blunt to produce eddy currents of greater than the permissible magnitude, with the core decreasing in cross sectional area toward the end remote from the pipe to result in a smooth flow of fluid therepast without creation of undesired eddy currents, and a continuation of the pipe which surrounds the core and preferably increases more or less regularly in diameter so that near the end of the core the diameter of the continuation is much greater than the diameter of the pipe.

Referring to the drawing, wherein one embodiment of my invention is disclosed, the shell 1 is provided with a hopper-shaped bottom 2 to collect solids which may be removed through manholes 3 or 4. The shell 1 is provided with an outlet 5. A gas inlet pipe or conduit 6 serves to lead downwardly into the shell 1 a substantially cylindrical stream of gas, such as blast furnace gas containing solids, and moving at high velocity. The velocity of such gas may be more than 3000 feet per minute. At the lower end of the pipe 6 a core 7 is disposed in axial alignment therewith. This core has a pointed but rather blunt-nosed end 8 adjacent to the end of pipe 6, increases in diameter from the nose for a portion of its length and then decreases in diameter to the pointed tail end 9. The core 7 is symmetrical about its longitudinal axis, and its outer surfaces are smooth and stream lined to such an extent that eddy currents of undesired magnitude are not created thereby at any point along its length.

A continuation of inlet pipe 6 is designated by the numeral 10. This continuation gradually and smoothly increases in diameter from approximately the nose of the core 7 to approximately the tail of the latter. This enlarged end portion 10 of the pipe 6 is approximately frusto-conical in form and terminates near the tail 9 of the core. Throughout its length it is spaced apart from the walls of the shell 1, so that gases passing therethrough may reverse their direction of flow and pass upwardly between the enlarged continuation 10 and the shell 1, and finally escape from the shell through the outlet 5. The lower end of the continuation 10 is spaced a sufficient distance above the hopper bottom 2 so that the gases which pass around the lower end of the continuation 10 will have plenty of space to flow above solids collected in the hopper 2 of shell 1.

The operation of the apparatus just described is substantially as follows:

Blast furnace gas carrying solid particles and moving at a velocity of perhaps 3000 feet per minute or more, flows in a substantially cylindrical stream downward through a pipe 6. When this stream strikes the blunt nose 8 of the core 7, it is changed into a hollow tubular stream abruptly, yet with sufficient smoothness to prevent the formation of harmful eddy currents. The gas continues on, the core 7 permitting the gas gradually and smoothly to expand inwardly, thus gradually closing up the interior space, and due to the diverging walls of the continuation 10 the gas is permitted simultaneously to expand outwardly. The abrupt change from a solid cylindrical stream to a hollow tubular stream, results in a very rapid decrease in velocity. The gradual decrease in the size of the interior or core space, together with the enlargement in the outside diameter of the stream, results in a slower reduction of velocity, the total result, as far as gas velocity is concerned, being that the gas is moving at a velocity of only a few hundred feet per minute when it reaches the end of the extension 10. Eddy currents of undesired magnitude are avoided during the travel of the gas after it has passed the nose end of the core 7, so that the velocity of the gas is reduced several thousand feet per minute in traveling through the extension 10, and this reduction is not accompanied by creation of eddy currents of undesired magnitude.

Since the nose portion of the core 7 is of substantially the same diameter as the inside of the pipe 6, substantially all the solids carried by the gas will strike against the sloping surface of the core and glance off, some of them possibly striking the inside of the continuation 10, but none of the solids having their velocity materially reduced thereby. Thus they continue their forward movement at a high rate of speed, out distancing the gases and continuing on to the bottom of the shell 1, where they collect. In this manner the velocity of the gas may be rapidly and smoothly reduced, while the velocity of the solids is not greatly reduced and with the result that the solids will not be carried upwardly by the gases when the latter reverse their direction at the lower end of the continuation 10. The absence of eddy currents of undesired magnitude at points below the end of the continuation 10, results in the solids remaining quietly in the hopper portion 2 of the shell 1, after having been projected thereto.

In Figure 3 a modified form of the present invention is shown, which modification may be employed for use with gases or liquids where the primary object is merely to decrease the velocity. A cylindrical stream of fluid flowing through pipe 11 encounters a core 12, is abruptly changed thereby into a hollow tubular stream, which stream is again changed into a cylindrical stream of larger cross sectional area after the fluid has passed the core 12. Since no eddy currents of more than the permissible maximum are created, the velocity is smoothly decreased without any of the results ordinarily attendant on the pressure of eddy currents of great magnitude.

In Figure 5 the change in velocity of a gas has been plotted against the change in cross sectional area of the stream of fluid when using a device of the character shown in Figure 1. It will be noted that the initial velocity of the gas at the end of pipe 6 is more than 3500 feet per minute, and that this velocity has been reduced to less than 1000 feet per minute within a distance of ten feet, after which the velocity decreases slowly. At the same time the area of the stream has increased from that of the pipe 6, which is something under 50 square feet to an area of about 150 square feet, at a distance of ten feet from the end of pipe 6, and to an area of about 400 square feet at the end of continuation 10.

In connection with the curves plotted in Figure 5 it will be noted that the curves indicate a rapid but smooth reduction of velocity at first, which reduction proceeds at a gradually decreasing rate to the end of the continuation 10 and which reduction is caused by a corresponding gradual increase of area as shown in the curves.

Having thus described my invention, what I desire to secure by Letters Patent is defined in what is claimed.

I claim:

1. Apparatus for cleaning gas including, in combination, a housing forming a cleaning chamber, an inlet pipe leading to said cleaning chamber and having a frusto-conical enlargement lying within said cleaning chamber, an outlet pipe, and means for diffusing the gas flow into the frusto-conical part of said inlet pipe, said means comprising a diffusing core relatively blunt at the forward end and having an elongated tapering tail, the cross sectional area of the space between said core and said enlargement increasing on successive planes normal to the longitudinal axis of the core from the blunt end of said core to the tail end thereof.

2. In apparatus of the type described, the combination of a housing having an inlet conduit leading thereinto, a frusto-conical enlargement disposed at the end of said inlet conduit within said housing and adapted to form a velocity reducing chamber, and a stream lined core member suspended within said enlargement and spaced therefrom with one end adjacent the junction of said inlet conduit and said enlargement, the cross sectional area of the space between said stream lined core member and said enlargement increasing on successive planes normal to the longitudinal axis of the core from the end of said core adjacent the junction of said inlet conduit and said enlargement to the opposite end thereof.

3. Apparatus for reducing the velocity of a moving stream of fluid including a conduit having an enlarged velocity reducing portion and a stream lined body suspended in said velocity reducing portion, said stream lined body having a relatively blunt head portion and an elongated tapering tail portion and being disposed in said enlarged velocity reducing portion of the conduit with its head end upstream of the moving stream of fluid, the cross sectional area of the space between said stream lined body and said enlarged portion of said conduit increasing on successive planes normal to the longitudinal axis of said stream lined body from the blunt head portion of said body to the tail portion thereof.

4. The method of reducing the velocity of a gas which includes the steps of flowing the gas in a stream, abruptly and smoothly changing the gas from said stream into an annular or hollow stream of increasing cross-sectional area, causing the total cross-sectional area of the hollow stream of gas and the center of said hollow stream of gas to increase and the cross-sectional area of the hollow center alone also to increase, and then causing the total cross-sectional area of the annular stream of gas and the hollow center thereof to continue to increase while the cross-sectional area of the hollow center of the annular stream is gradually reduced in a sharply defined path without the creation of substantial eddy currents until the gas forms a solid stream of greater cross-sectional area than said first named stream.

5. The method of reducing the velocity of a stream of gas which consists in causing a column or current of gas to change into an annular or hollow current of gas, the outside and inside cross-sectional dimensions of said hollow current of gas both increasing for a predetermined distance along the path of gas travel, and then causing said hollow current to gradually and smoothly change to a solid current without the creation of substantial eddy currents by continuing to cause the outside dimension to increase while gradually decreasing the inside dimension of the hollow stream whereby the inside and outside of said hollow stream both follow sharply defined paths and the stream changes into a column of greater area and lower velocity than the original current.

ARTHUR G. McKEE.